(12) United States Patent
Sellers-Blais

(10) Patent No.: US 8,842,158 B2
(45) Date of Patent: Sep. 23, 2014

(54) SYSTEM AND METHOD FOR TELECONFERENCING

(75) Inventor: Dominic Sellers-Blais, Corvallis, OR (US)

(73) Assignee: Visionary Mobile Corporation, Corvallis, OR (US)

( * ) Notice: Subject to any disclaimer, the term of this patent is extended or adjusted under 35 U.S.C. 154(b) by 212 days.

(21) Appl. No.: 13/484,496

(22) Filed: May 31, 2012

(65) Prior Publication Data

US 2012/0306993 A1 Dec. 6, 2012

Related U.S. Application Data

(60) Provisional application No. 61/491,741, filed on May 31, 2011.

(51) Int. Cl.
*H04N 7/15* (2006.01)
*H04L 29/06* (2006.01)

(52) U.S. Cl.
CPC ........ *H04L 65/1009* (2013.01); *H04L 65/4038* (2013.01); *H04L 65/80* (2013.01); *H04N 7/15* (2013.01); *H04L 65/1006* (2013.01)
USPC ................... 348/14.09; 348/14.08; 348/14.12

(58) Field of Classification Search
CPC . H04L 65/1009; H04L 65/80; H04L 65/4038; H04L 65/1006; H04N 7/15; H04N 7/141; H04N 7/142; H04N 7/144; H04N 7/147; H04N 7/148; H04N 7/152; H04N 7/155
USPC ........................................... 348/14.01–14.16
See application file for complete search history.

(56) References Cited

U.S. PATENT DOCUMENTS

| | | | |
|---|---|---|---|
| 2009/0037534 A1* | 2/2009 | Castro et al. .................. | 709/205 |
| 2009/0290012 A1* | 11/2009 | Ma et al. ..................... | 348/14.08 |
| 2011/0161836 A1* | 6/2011 | Mu et al. ....................... | 715/756 |
| 2011/0279638 A1* | 11/2011 | Periyannan et al. ....... | 348/14.09 |
| 2012/0262537 A1* | 10/2012 | Baker et al. ................ | 348/14.08 |

\* cited by examiner

*Primary Examiner* — Melur Ramakrishnaiah
(74) *Attorney, Agent, or Firm* — Law Office of Karen Dana Oster, LLC

(57) ABSTRACT

A system and method of managing video conferencing over a network, among a plurality of clients using a server as an intermediary is disclosed. At the server a real-time video stream is received from each client. This real-time video stream may be a high frequency stream representative of video from a camera associated with the end user. The server serves to any given client, a real-time video stream selected by the given client from among the video streams received at the server.

85 Claims, 11 Drawing Sheets

US 8,842,158 B2

SYSTEM AND METHOD FOR TELECONFERENCING

PRIORITY

The present U.S. patent application claims the benefit of priority from U.S. provisional patent application No. 61/491, 741 filed May 31, 2011, which is incorporated herein by reference in its entirety.

TECHNICAL FIELD

The present invention relates to teleconferencing, and more particularly to video teleconferencing systems that may have many participants.

BACKGROUND ART

Teleconferencing may involve the exchange of audio, video, and other media streams across a plurality of remote persons connected to a communication network through an endpoint device such as a telephone. With the extension of teleconferencing into endpoint devices capable of more sophisticated interactions such as personal computers, teleconferencing presently can include features such as text chat and the sharing of onscreen displays. These capabilities can be seen in existing commercial teleconferencing systems such as Cisco's WebEx and Microsoft's Live Meeting software.

Such existing teleconferencing systems allow a single participant to be the presenter, able to administer and direct the machinations of the other participants. In particular, a media stream that requires a high level of network bandwidth such as motion video will traditionally only be broadcasted by the presenter. This limitation is imposed to conserve network and processor resources as multi-point video teleconferencing systems in which a plurality of endpoint devices all send a high bandwidth video stream to all other endpoint devices within the teleconference creates an exponential N×N transmission, reception, and processing requirement for each such device.

The ability to do screen sharing, in which the video display of a single participant is mirrored onto the video displays of other participants, is limited to the presenter. Similarly, most of the functions that direct attention to a particular document are controlled by the presenter. The existing top-down model of presentation significantly reduces the independence of non-presenter participants relative to their usage of their endpoint device outside of teleconferencing and potentially their contribution to the teleconference.

A particular feature of some teleconferencing systems is co-browsing, which provides teleconference participants with the ability to navigate and interact with hypertext webpages in a synchronized manner. As the hypertext content on the World Wide Web has become more complex and interactive, synchronizing the navigation and interaction between participants has likewise become more difficult. As a result, current teleconferencing systems supporting co-browsing do so through either extension of their screen sharing mechanism or by plug-ins to existing web browsers which delegate basic navigation commands such as the loading of a Uniform Resource Locator (URL). Synchronization of co-browsing is especially hindered by differencing between client browsers including their rendering engines and even their version within a single product line.

Existing teleconferencing systems do not allow participants to easily migrate between teleconferences or to derive new teleconferences from existing ones due to their transient data retention. Participants are specific to particular teleconferences and may not be easily merged or otherwise modified.

The future utility of current teleconferencing systems is further limited by the ephemerality of both the teleconference and their participants' actions. Upon the conclusion of a teleconference, only partial or no data is retained as a record of the actions within the teleconference. In particular, the data collected from a teleconference is not available as the subject of a future teleconference through a formal representation nor are participants' relation to formal representations analyzed across multiple teleconferences.

BRIEF SUMMARY OF THE EMBODIMENTS

In one embodiment of the invention, a method of managing video conferencing over a network, among a plurality of clients using a server as an intermediary is disclosed. At the server, a real-time video stream is received from each client. This real-time video stream may be a high frequency stream representative of video from a camera associated with the end user. The server serves to any given client, a real-time video stream selected by the given client from among the video streams received at the server.

In embodiments of the invention, there are at least three clients that are each transmitting a video stream. The server may also serve to each client a set of thumbnail camera images or video streams representative of the video streams received from one or more of the clients. It should be recognized that the set of thumbnails received by a client may or may not include a thumbnail image for that client. Additionally, the set of thumbnail images may or may not include an image of the selected real-time video stream provided to the client.

Embodiments of the invention allow a user to group clients into groups. Further, content to be shared by the clients can be defined in relation to a group. The server provides to each client over the network a URL identifying the shared content. The shared content may include a web page or other document and the shared content may have associated meta-data and annotations. In addition to providing shared content, the server may create a historical record of the video conference within a database including identifiers identifying all of the shared content by the clients. The shared content along with any associated data may be referred to as curated content.

In certain embodiments of the invention, the server receives a rating for shared content from one or more clients. The server associates the rating with a database entry for the shared content in a database containing a listing of shared content wherein each entry in the database for shared content is identified by a URL. Additionally, embodiments of the invention allow clients to send to the server one or more meta-data describing the shared content. The server associates the meta-data with a database entry for the shared content in a database containing a listing of shared content. A client may also send a link of different content to the server. The link of different content is associated with shared content currently presented. The server receives the link to different content and associates the link with a database entry for the shared content in a database containing a listing of shared content. A client device may also transmit and the server receives an annotation to the shared content. The server associates the annotation with the database entry for the shared content.

In other embodiments of the invention, the server receives a request message for a change in the shared content to new shared content by a requesting client. The server provides to one or more of the clients as indicated by the requesting client a URL identifying the new shared content. The shared content may be changed at the requesting client and also at other participating clients of the group. In such embodiments, the server receives a request message from a requesting client to change the shared content to new content and the server access a permissions database to confirm that the requesting client has the authority to change the shared content. Further, the server may confirm that the requesting client has authority to change the shared client presented to other clients. Upon confirmation, the server distributes the new content to one or more other clients.

Embodiments of the invention may include end-point devices such as an Internet-connected telephone, Internet-connected computer and/or Internet-connected electronic devices.

As previously mentioned, the server may receive a request to create a group of selected clients associated with a group identifier. The server stores the group identifier in a database entry of a group database.

The client-selected real-time video stream is served to the selecting client as a high-frequency video stream. Additionally, in embodiments of the invention, the server serves to the selecting client a low-frequency stream including real-time video streams received by the server other than the selected real-time video stream. In other embodiments, the low-frequency stream includes a set of thumbnail video images based at least on streams received from some of the other clients.

The methodology may also include defining, at the server, content to be shared by the clients where the server provides to each client over the network a URL identifying the shared content and the shared content is provided to the clients in a low-frequency stream.

One embodiment of the present invention is a platform designed to be an online collaboration tool. The software allows users and groups to collaborate in a shared networked environment. For example, collaborators may be a group of scientific peers discussing global climate change models, a teacher with a group of students, or multiple medical professionals coordinating around patient-centric care. The co-browsing mode allows participants to see and interact with content in synchronization with other participants in a more complex way than previously possible. Each participant can act as a presenter and orchestrate a dynamic and interdependent exploration of content on the web or in the system's database. Alternatively, one participant can assume control and lead the group through a discussion or lesson. This allows for meaningful group interaction focused on whichever point of interest is being discussed.

The exemplary embodiment enhances online collaboration by providing many-point streaming multimedia connections in addition to traditional point-to-point and multi-point connections. Participants can freely mix between participant groups and create subgroups. The many-point environment allows multiple presenters at a time. An embodiment of the invention includes video management techniques that allow for bandwidth-managed many-to-many sessions. As users choose different video participants to connect with, the server manages the connection and quality dynamically. Additionally, the server provides video management services including recording, playback, broadcasting, transcription, and transcoding to standard VOIP devices.

As participants interact with the system, metadata is created in relation to their foci. This meta-data may then itself become the focus of future collaboration and secondary metadata may be related to it; this process may be continued ad infinitum.

In this embodiment, the system works within a secure cloud computing infrastructure and utilizes a semantic web database. This allows for the aggregation of unstructured content and data, which means it mimics life better than highly structured relational databases. It also makes it much easier to organize, utilize, and discover meaning from every experience associated with collaboration.

BRIEF DESCRIPTION OF THE DRAWINGS

The foregoing features of embodiments will be more readily understood by reference to the following detailed description, taken with reference to the accompanying drawings, in which:

FIG. 4b is a continuation of the sequence diagram of FIG. 4a;

DETAILED DESCRIPTION OF SPECIFIC EMBODIMENTS

Figure 1:
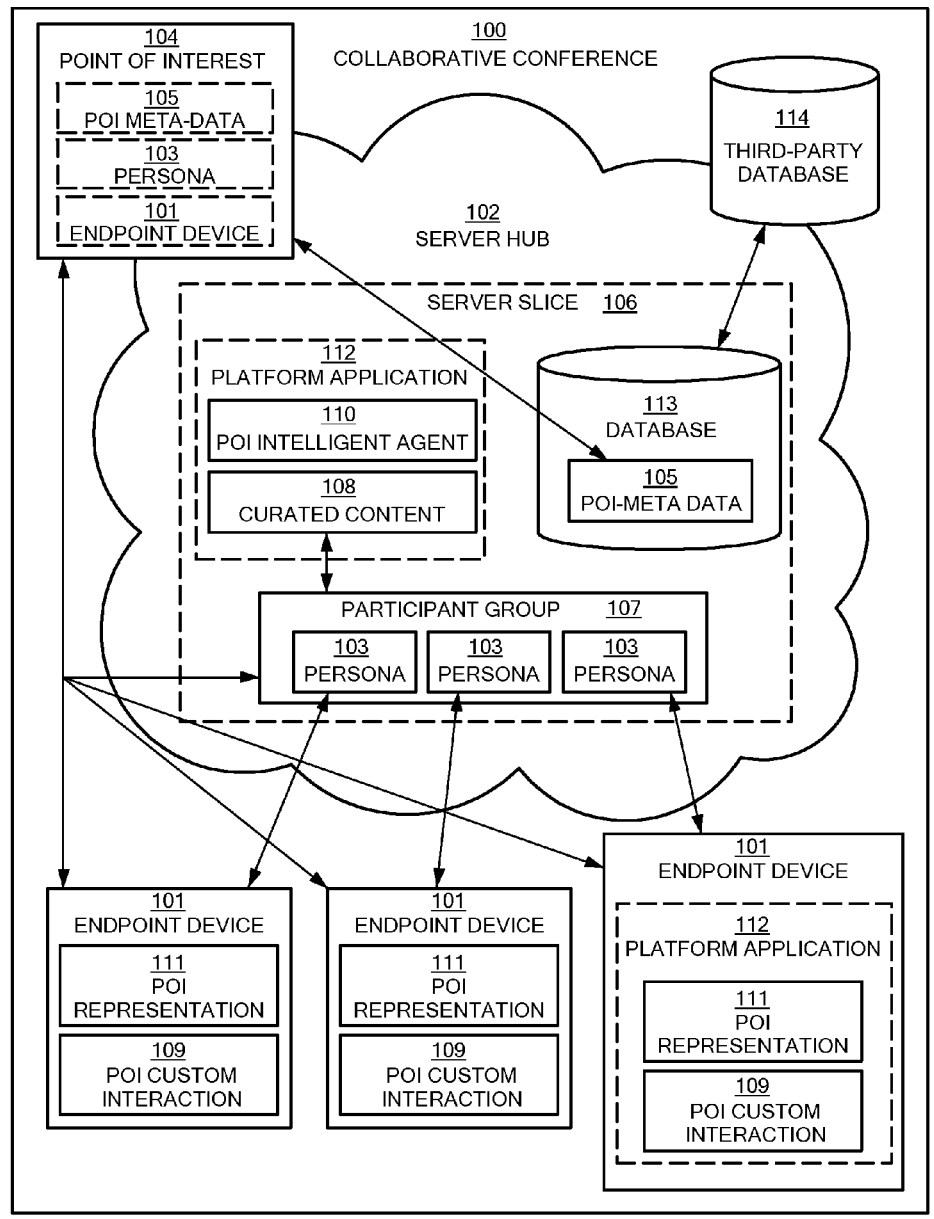
FIG. 1 is a block diagram showing devices involved in a teleconference as contemplated in one embodiment of the invention including a server and multiple endpoint devices.

Definitions. As used in this description and the accompanying claims, the following terms shall have the meanings indicated, unless the context otherwise requires:

A "teleconference" is the exchange of audio, video and/or other media streams between a plurality of participants through a communication network.

A "persona" is an identifier of a user. A persona may be a user name, a user name and password combination or another identifier for uniquely identifying a user of the system A "POI" is a point of interest that identifies content, via its URL, to be shared among a plurality of participants in a teleconference. The content to be shared may be one or more HTML pages, videos, movies, or interactive web applications. A POI may also relate to annotated or augmented content that contains tags or metadata, such as curated content.

"Curated content" is content, shared in the course of a teleconference by participants using clients that are in communication with a server that has been stored by the server as part of the historical record of the teleconference. Curated content can include more HTML pages, videos, movies, or interactive web applications, as well as tags, annotations, and metadata created in the course of sharing content. Curated content for a first teleconference may be accessed and used in subsequent teleconferences or for other analysis purposes.

The following detailed description refers to the accompanying drawings. Wherever possible, the same reference numbers are used in the drawings and the following description to refer to the same or similar elements. For clarity and simplicity, not all characteristics of practical embodiments are described in the specification. However, it is appreciated that many embodiment-specific decisions have to be made in developing the practical embodiments in order to achieve a particular object of the developer. While embodiments of the invention may be described, a person skilled in the relevant art would recognize that modifications, adaptations, and other implementations are possible without parting from the spirit and scope of the invention. For example, substitutions, additions, or modifications may be made to the elements illustrated in the drawings, and the methods described herein may be modified by substituting, reordering, or adding stages to the disclosed methods. Accordingly, the following detailed description does not limit the invention.

FIG. 1 illustrates an embodiment of a system and method for networked collaboration and video telepresence. The system 100 allows distributed endpoints 101, software programs that run on personal computers, tablets, or mobile phones and allows the user to connect to and use the central server hub 102. Participants login to the hub with their persona 103 (e.g. a user id linked to a user profile) and use their client to visit points of interest 104 (POI) while sharing metadata 105 about the content they are visiting with other users.

In this particular embodiment, the iPad, iPhone, and other endpoints operate as standard modal applications, providing a window into the POI accompanied by collaboration and moderation functionality. Personal computer endpoints operate as desktop applications focused around an embedded browser. The server hub 102 may be a GNU/Linux virtual machine image in a cloud computer center. The server is the interface point for all client collaboration including video teleconferencing. The semantic database, mathematical operations, and persona models are all stored on the server. Those skilled in the art will recognize that the particulars of this embodiment are translatable to other operating systems and hardware.

A server hub may be specific to a particular organization's usage of the platform. Furthermore, the services a server hub provides may be provided as a unique slice 106 or instance for different organizations and a single virtual or physical hardware resource thereby shared.

Each participant has one or more personae, or user profiles, which they login as when connecting to a server hub 102. A persona is linked to an e-mail address and provides an unambiguous reference to a user while they are logged into the system. Each persona contains a model of the user based on their rating, tagging, or custom interaction with POIs while on the system. The value of their participation for clusters of other personae is used to derive a reputation model for the target persona relative to another persona.

Personae may be collected into groups 107, which fulfill the similar role as the traditional teleconferencing session. Groups may have roles for specific personae such as moderator, author, participant, and visitor. Permissions may be associated with specific personae or roles. Permissions within a group may also be given to other groups via group roles such as with classrooms within a school.

POIs 104 are online resources such as HTML pages, videos, movies, or interactive web applications. The fundamental identifier of a POI is its URL. When a POI is visited by a user, the user may perform a number of operations distinct from directly interacting with the POI. These participatory operations and their resulting metadata 105 include:

Rating the POI along one or more vectors (e.g. accuracy, interestingness, originality);

tagging the POI with keywords or predicate object pairs along with an optional fuzzy weighting;

providing links to other POI with a specified relationship (e.g. similar, controverted, etc);

annotating either the whole POI or a part of it (e.g. an excerpt of an article or a time within a movie) through text, image, audio, or video;

sharing the POI with other personae or through their existing social networking sites;

and using an authored interaction to generate custom content.

Significantly, each result of participation may also be treated as a POI and rated, tagged, linked, annotated, shared, or otherwise interacted with. Due to the graph so created, a POI may be viewed not only for its content per se, but also for the participation around it (just as many news aggregators).

The level or participation for a persona is tracked both within a group and/or within a community of groups and on the server hub as a whole. Participation can strongly influence reputation by demonstrating reliably defined input.

The visibility of the participation content may be set by the persona or the publisher of the POI in the case of curated content and persona POIs.

A persona may group POIs into a collection known as curated content 108. The persona may connect these POI in a linear or non-linear way and may provide initial interaction POIs such as tags. The curated content set forms a POI.

Depending on the permissions for a persona within a group, navigation of POI may be independent and asynchronous or it may be synchronous and decided by a specific role, curated navigation, or vote. When navigating as part of a group, users have active visibility of other group members and may interact directly with them as their POI.

When a persona is the POI, a user may interact with them differently depending on whether the user is online and other factors. When the user is online, video teleconferencing may be possible either through a private call or through a broadcast call. For broadcast calls, the broadcasting persona must elect to publish their video stream and selects the permissions required to view it (e.g. group membership).

Personae may also be interacted with through all of the standard POI interaction mechanisms such as annotation and tagging. As mentioned previously, the visibility of these interactions is configurable.

Interaction with a POI may be done through a custom interface 109. These interfaces are designed using standard technologies such as HTML5. All data provided by the form is collected and becomes available as a POI. Data types are specified during authoring and may be enforced. More advanced users may take advantage of the provided API to create custom interaction mechanisms, data types, and validators. Custom interactions may be associated with POIs through curated content, user preferences, group membership, or specific POI settings.

External organizations or individuals may extend the system by designing their own custom interfaces. Additionally, third-party extension may be performed through custom meta-data 105, POI representations 111, or agents 110.

Within a group a moderator role may be established, especially for a given curated content set. A moderator typically helps remove informational detritus from a POI or content set. Within a group or a community of groups, the moderation of participation may heavily influence the calculated reputation of a persona.

Certain interaction mechanisms may require a moderator to properly classify, grade, or review their input. Additionally, personae within a group may be supervised by a moderator, allowing feedback at a group level rather than a content level. In practice, this can include visibility of each group member's POI.

The meta-data surrounding a POI, including the set of personae data connected to it, is analyzable by POI Intelligent Agents (PIA) 110. PIAs may create or update content such as a report, 'train' a collection system such as a custom interaction mechanism, classify and cluster POIs and personae (e.g. matchmaking), process moderation actions, or perform other programmatic services. PIAs may run periodically or immediately after an action such as meta-data creation. Because PIAs run on the hub server, their development is more closed and requires permission to configure the server or server slice.

All meta-data has two dimensions regardless of the type of meta-data or its content: the chronological timestamp and the POI to which it pertains. These form the basis for later review and analytics. For example, a video annotation meta-datum may be reviewed as a POI at a later date and then given textual tags as a meta-data to the meta-data. The archival and recall of meta-data provides persistent and expanding usefulness for the system.

When a user or PIA-generated POI is viewed, the interface representation may be determined through a custom POI representation 111. POI representations use a visualization API often in combination with interaction mechanism datatype descriptions to render static and interactive POI descriptions. For example, a POI Representation of rating data may calculate and display the arithmetic mean rating for a set of ratings. More complex representations are also possible using an API similar to the advanced authoring toolkit.

PIAs, custom interactions, POI representations, group skeletons, role sets, and curated content form the standard basis of an application 112 that may be run on the platform. By combining these resources, an application may contain an extensive collection of subsystems to allow things ranging from learning decision trees (expert systems) to reputable news generation tailored to the trust system of a persona. All this content and all interactions of the participants are persisted to the server's database 113 to allow retroflexive use as POIs. The server's database may be further extended by integration with a third party database 114 to create meta-data, POIs, and other objects as archived or immediate resources.

Figure 2A:
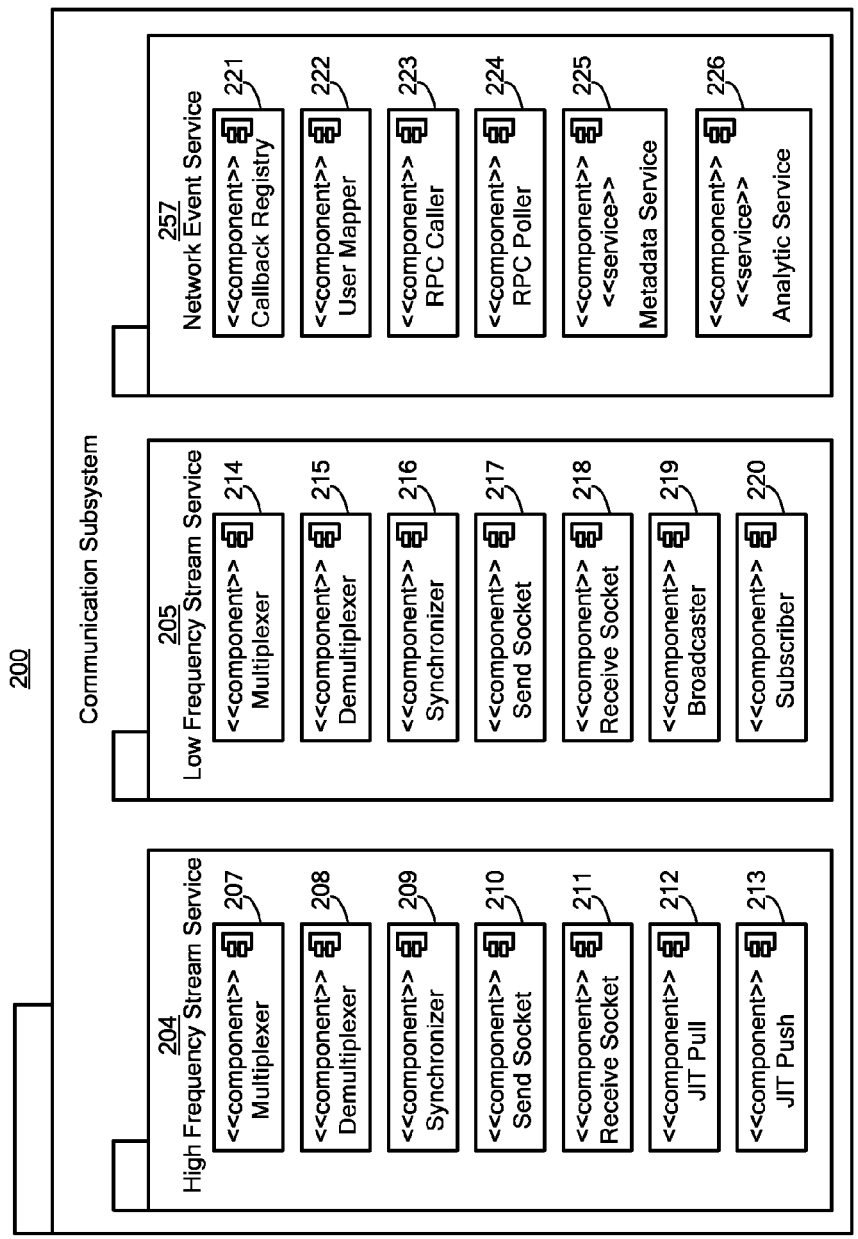
FIG. 2a is a block diagram illustrating an exemplary embodiment of the system architecture including various components on an endpoint device.
Figure 2B:
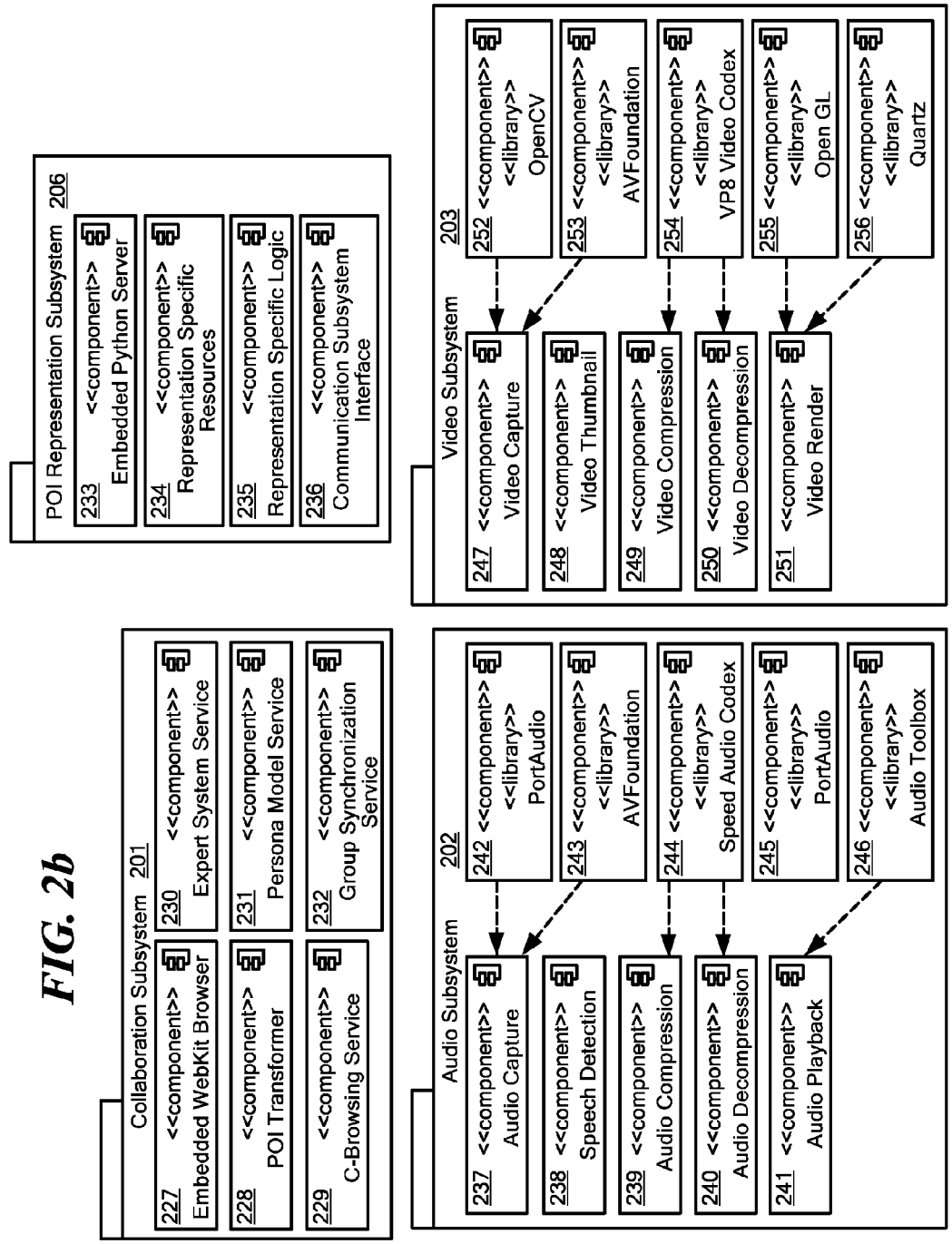
FIG. 2b is a continuation of the block diagram of FIG. 2a showing additional components of the system architecture on an endpoint device.

FIG. 2 illustrates the software components in an exemplary embodiment of a client endpoint. In this example, the communication subsystem 200 is comprised by three main services. The high frequency stream service 204 is used for rapidly updating media such as video frames and multiplexes 207 updates; demultiplexes 208 updates; synchronizes 209 changes; uses a pair of send 210 and receive 211 sockets for communication via internet protocol; and accumulates and drains the latest frame buffer via a just-in-time push 213 and pull 212 mechanism.

In a similar fashion, the low frequency stream service 205 which is used for occasional and non-immediate data such as navigation changes multiplexes 214 updates; demultiplexes 215 updates; synchronizes 216 changes; uses a pair of send 217 and receive 218 sockets for communication via internet protocol; and performs gather and scatter operations through a broadcaster 219 and subscriber 220 mechanism.

The third service in the communication subsystem 200 is the network event service 205, which is used for receiving callbacks 221 from the server; managing the proxy representation of other users 222; remote procedure calls (RPC) 223 and regular RPC polling timers 224; and wrapping access to POI metadata 225 and analytics 226.

The audio subsystem 202 allows audio input and output via capture 237 provided by PortAudio 242 or AVFoundation 243; playback 241 through PortAudio 245 or Audio Toolbox 246; Speex 244 compression 239 and decompression 240; and speech procession 238.

The video subsystem 203 allows video input and output via capture 247 provided by OpenCV 252 or AVFoundation 253; rendering 251 through OpenGL 255 or Quartz 256; VP8 254 compression 249 and decompression 250; and the generation of video thumbnails 248. Those skilled in the art would recognize that other codecs such as H.264 and AAC would work through the same mechanism.

The collaboration subsystem 201 provides rendering and interaction via an embedded WebKit browser 227; specialization POI transformation 228 such as through XSLT; access to the co-browsing 229, expert system 230, personal model 231, and group synchronization 232 services; and a POI representation subsystem 206 that provides specialized rendering and interaction with a POI via an embedded Python web server 233, representation specific resources 234 and logic 235, and an interface into the communication system 236.

Figure 3:
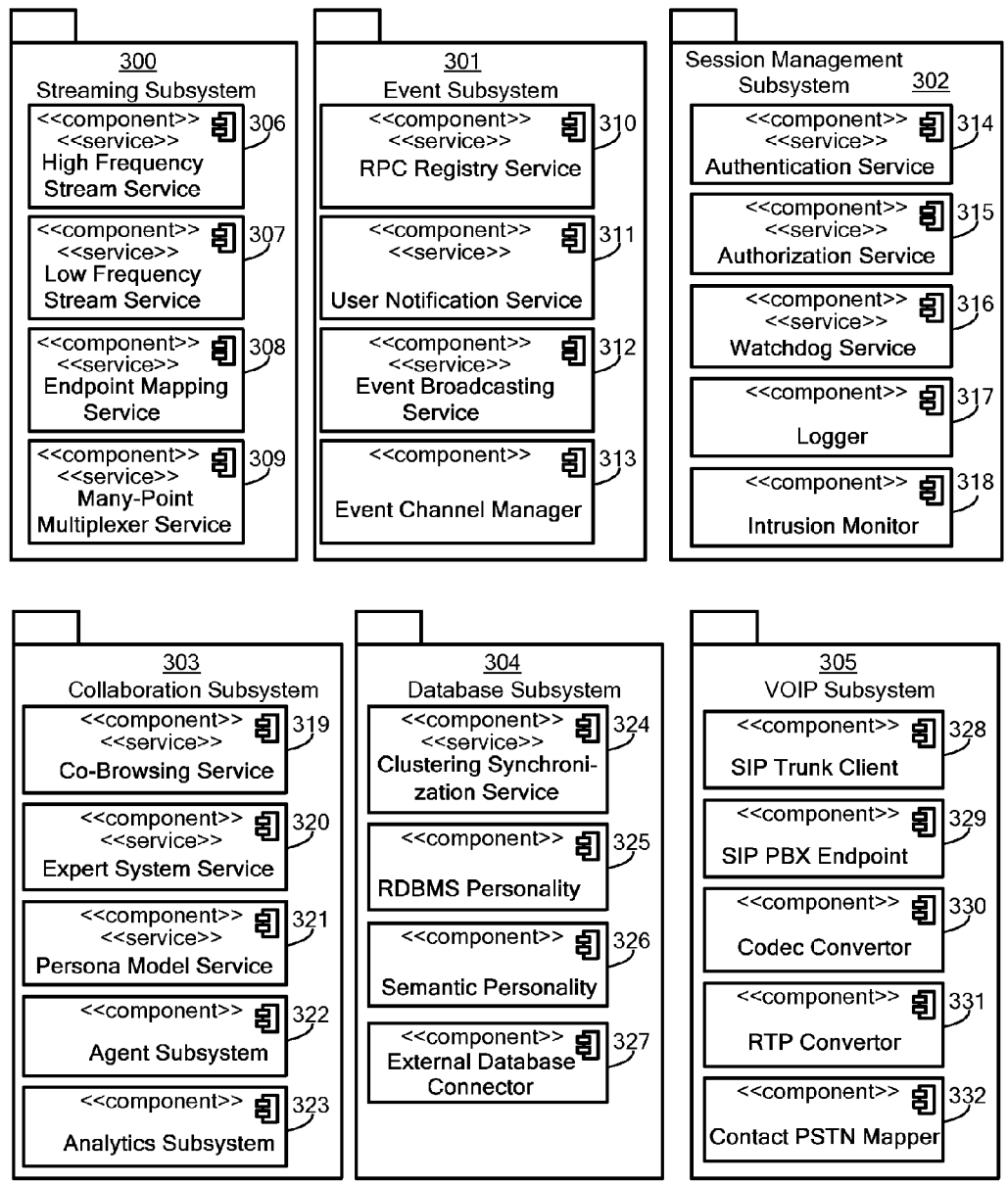
FIG. 3 is a block diagram illustrating an exemplary embodiment of the system architecture on the teleconferencing server.

FIG. 3 illustrates the software components in an exemplary embodiment of the teleconference server. The streaming subsystem 300 provides endpoints and agents with high frequency stream 306, low frequency stream 307, endpoint mapping 308, and many-point multiplexing 309 services useful for the interchange of multimedia data.

The server event subsystem 301 provides endpoints and agents with RPC registration 310, user notification 311, event broadcasting 312, and event channel 313 services useful for propagation and reception of events through the endpoint mesh.

The server session management subsystem 302 provides endpoints and agents with authentication 314, authorization 315, watchdog 316, logging 317, and intrusion detection 318 facilities useful for general administration and access control.

The server collaboration subsystem 303 provides server facilities for co-browsing 319, expert systems 320, the persona models 321, the agent subsystem 322, and the analytics subsystem 323.

The server database subsystem 304 provides server facilities for synchronization among server clusters 324, operating as a relation database management system (RDBMS) 325, operating as a semantic database 326, and connecting to external databases 327.

The server voice over internet protocol (VOIP) subsystem 305 provides server facilities for acting as an endpoint for a third-party SIP (Session Initiation Protocol) PBX (Private Branch eXchange) 329, connecting to the PSTN (Public Switched Telephone Network) via a SIP trunk 328 and contact mapper 332, and performing on-the-fly protocol 331 and codec 330.

Figure 4A:
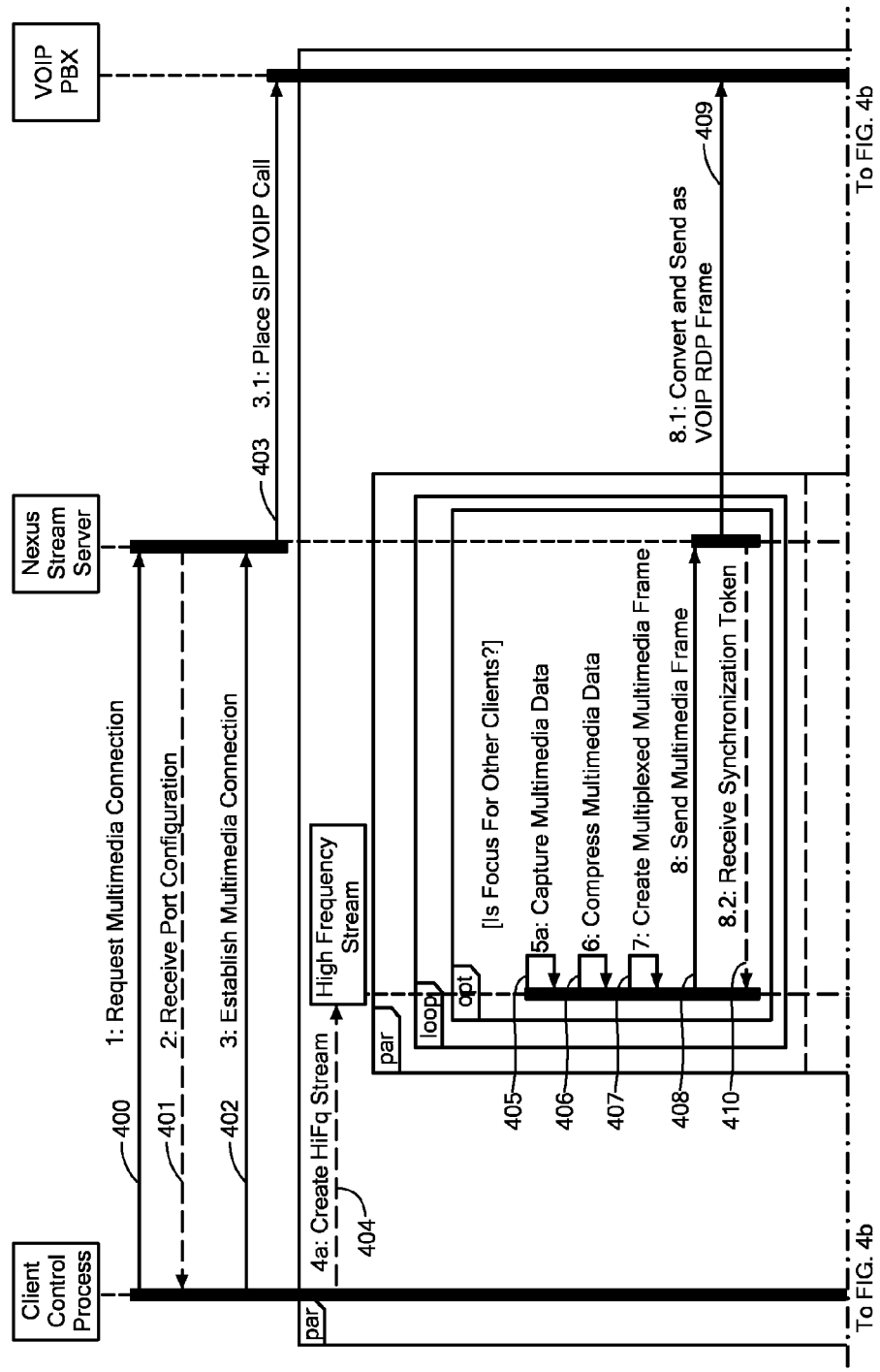
FIG. 4a is an exemplary sequence diagram illustrating communication between a server, an endpoint, and VOIP PBX.
Figure 4B:
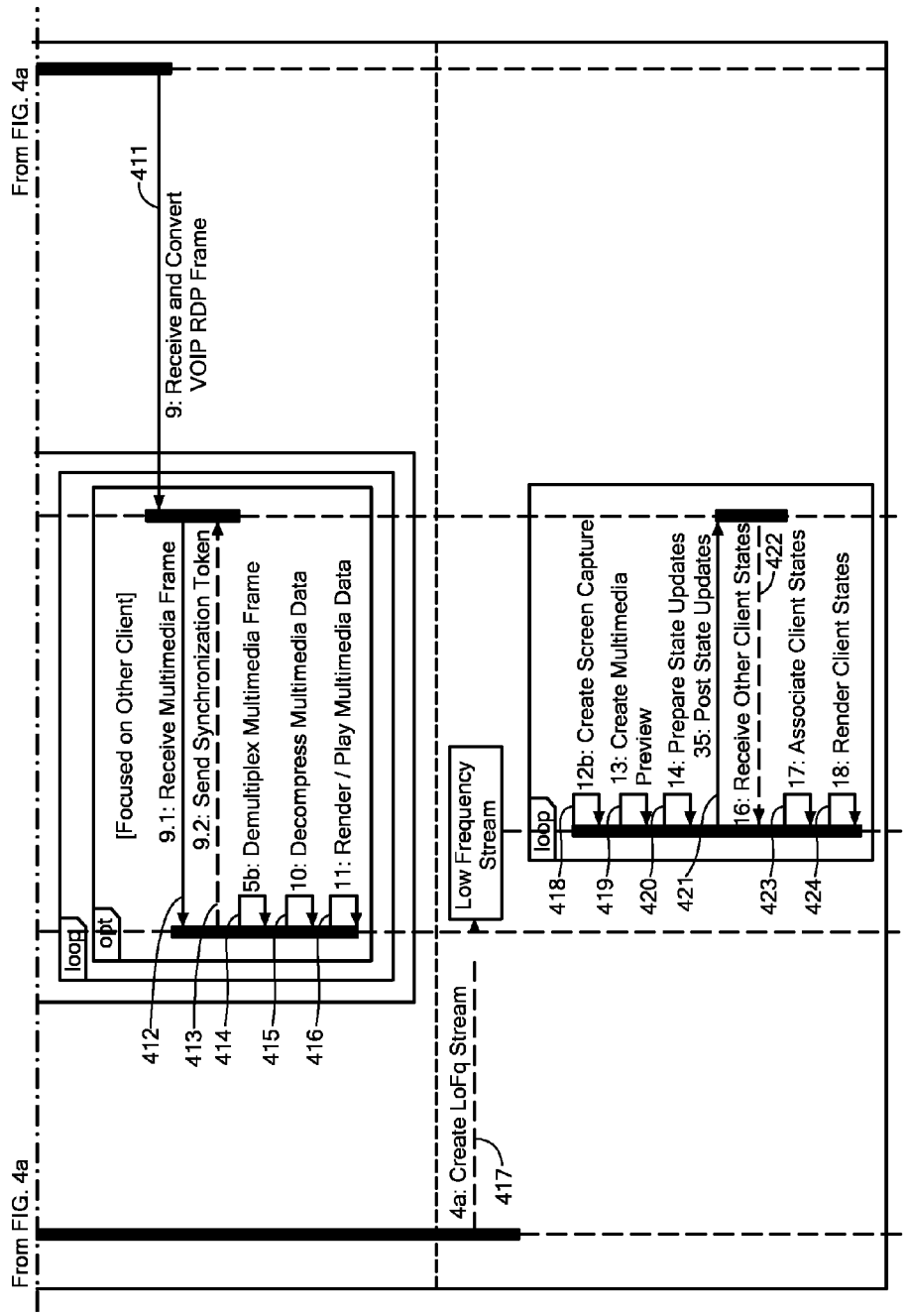

FIG. 4 illustrates an example sequence of stream communication events between an endpoint client, the server, and a third-party VOIP PBX. In this embodiment, the endpoint requests a multimedia connection 400 from the server that returns a port configuration 401. This information is then used to establish the multimedia connection 402 between endpoint and server. At this point, the server then places a SIP VOIP call 403 to the VOIP PBX via the VOIP subsystem 305.

The endpoint now creates a high frequency 404 and low frequency 417 stream in parallel. The terms high frequency and low frequency streams are used to show relative changes over time of the transmitted information. Thus, a high frequency stream would require a higher throughput than a low frequency stream. A high frequency stream might include a full-motion video conferencing stream from one or more cameras. A low frequency stream may include thumbnail still images from one or more cameras. Additionally, the low frequency stream may include POI data. The high frequency stream performs input and output in parallel. If the endpoint is the focus for another endpoint client, output begins by capturing the multimedia data 405, compressing this data 406, multiplexing it with other high frequency media 407, and sending it to the server 408.

The server then transcodes and sends the frame to the VOIP PBX 409, periodically returning a synchronization token to the endpoint 410. This output process is then repeated.

If the endpoint is focused on another endpoint client, it receives the input by the server getting a converted (if not a native endpoint) VOIP frame 411. The endpoint then receives this frame 412, sends a periodic synchronization token 413, demultiplexes the frame 414, decompresses each stream 415 and renders or plays 416 it as client output. This input process is then repeated.

The low frequency stream 417 loops by periodically creating a screen capture 418, creating a preview sample of the multimedia inputs 419, assembling an update of this and any other low frequency state 420, and posting this update 421 to the server. The server then returns the updates for other clients 422 in the teleconference, which the endpoint associates with each proxy representation 423 and renders if needed 424. This input and output process is then repeated.

Figure 5A:
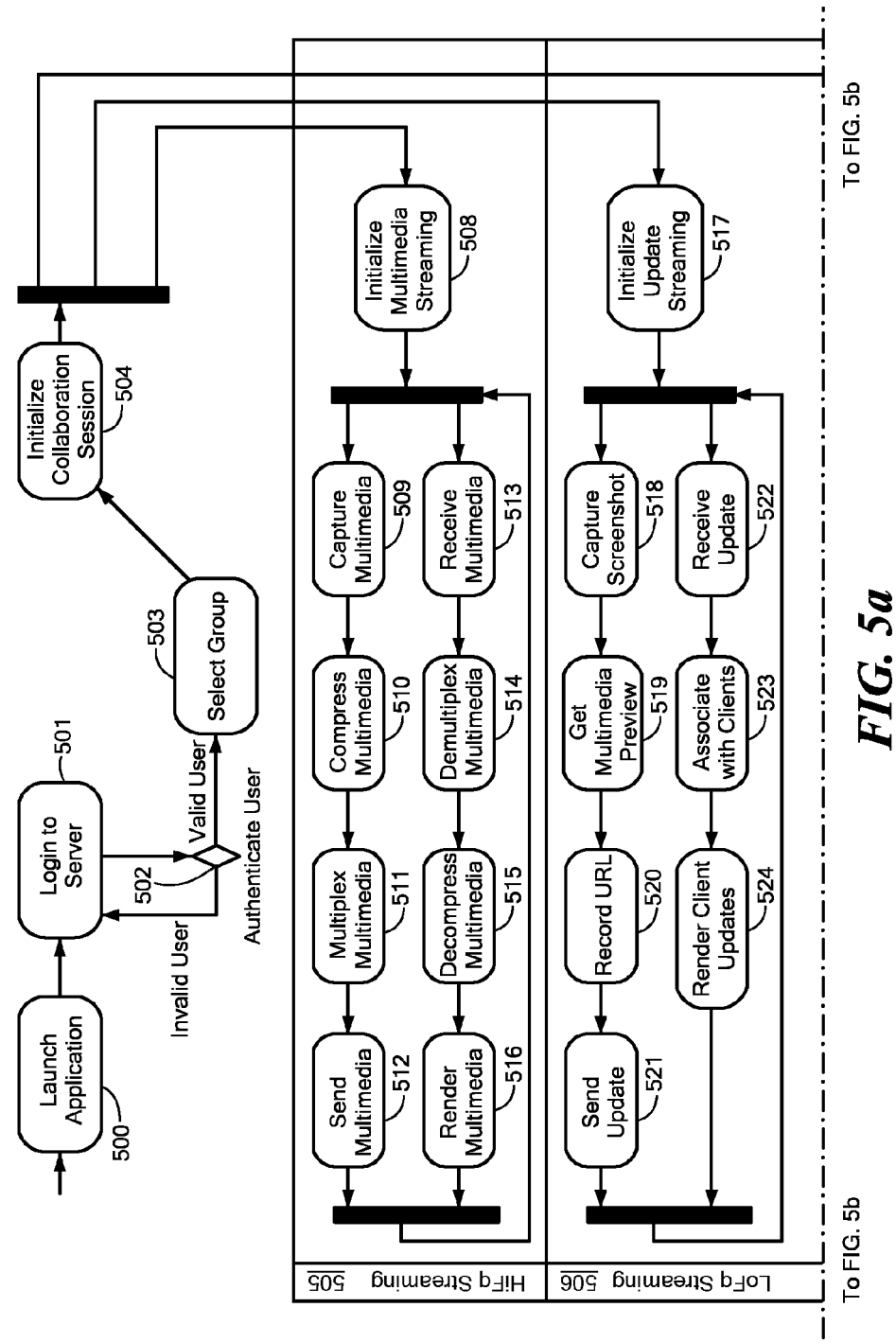
FIG. 5 is an exemplary activity diagram illustrating collaborative and streaming communication within an endpoint device.
Figure 5B:
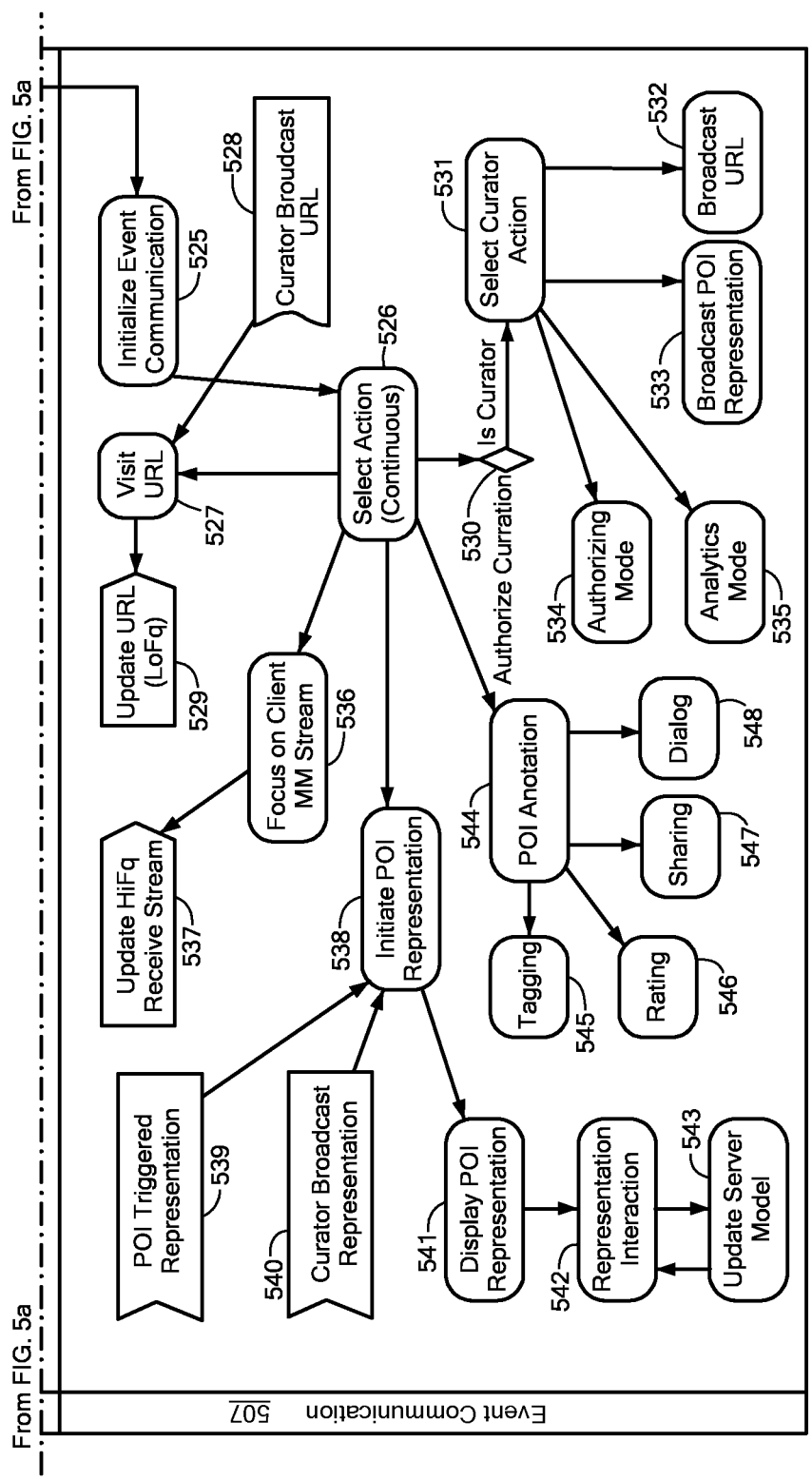

FIG. 5 is an activity diagram illustrating collaborative and streaming communication within an endpoint device, particularly with regard to the facilities of collaboration. The participant begins by launching the application 500 and logging into the server 501. If the login is successful 502 the participant selects the group 503 they are participating within and the collaboration session is initialized 504, creating three parallel activities: a high frequency streaming activity 505, a low frequency streaming activity 506, and an event communication activity 507.

Within the high frequency streaming activity 505 the endpoint begins by initializing the multimedia streaming 508 as described in FIG. 4. The endpoint captures 509, compresses 510, multiplexes 511, and sends 512 multimedia in parallel with receiving 513, demultiplexing 514, decompressing 515, and rendering 516 high frequency multimedia such as video and continuous audio. This activity is ongoing.

Within the low frequency streaming activity 506 the endpoint begins by initializing update streaming 517 as described in FIG. 4. The endpoint captures a screenshot 518, gets a multimedia preview 519, records the current URL and other state 520, and posts the update 521. The endpoint also receives updates 522 from other clients, associates them with their proxy representations 523, and renders them 524 in the manner appropriate to their media type. This activity is ongoing.

In the event communication streaming activity 507, the endpoint begins by initializing event communication 525, selecting a collaboration action 526 which, for example, may be but is not limited to visiting a URL 527 causing an update on the low frequency stream 529, focusing on another client's multimedia stream 536 and receiving its high frequency multimedia stream 537, annotating a POI 544 via tags 545, ratings 546, communicating its location 547, discussion 546, or an additional mechanism. Visiting a URL 527 may also be triggered by a broadcast from another endpoint 528. Other actions client may take include initiating a POI representation 538 (which can also be broadcasted 540 or triggered by visiting a POI 539) which will display the custom POI representation 541 and allow interaction 542 and server communication 543 specialized to that POI representation.

If the client is authorized as a curator 530 they may also select a curator action 531 such as entering authoring mode 534, entering analytics mode 535, or broadcasting a URL 532 or POI representation 533.

Figure 6:
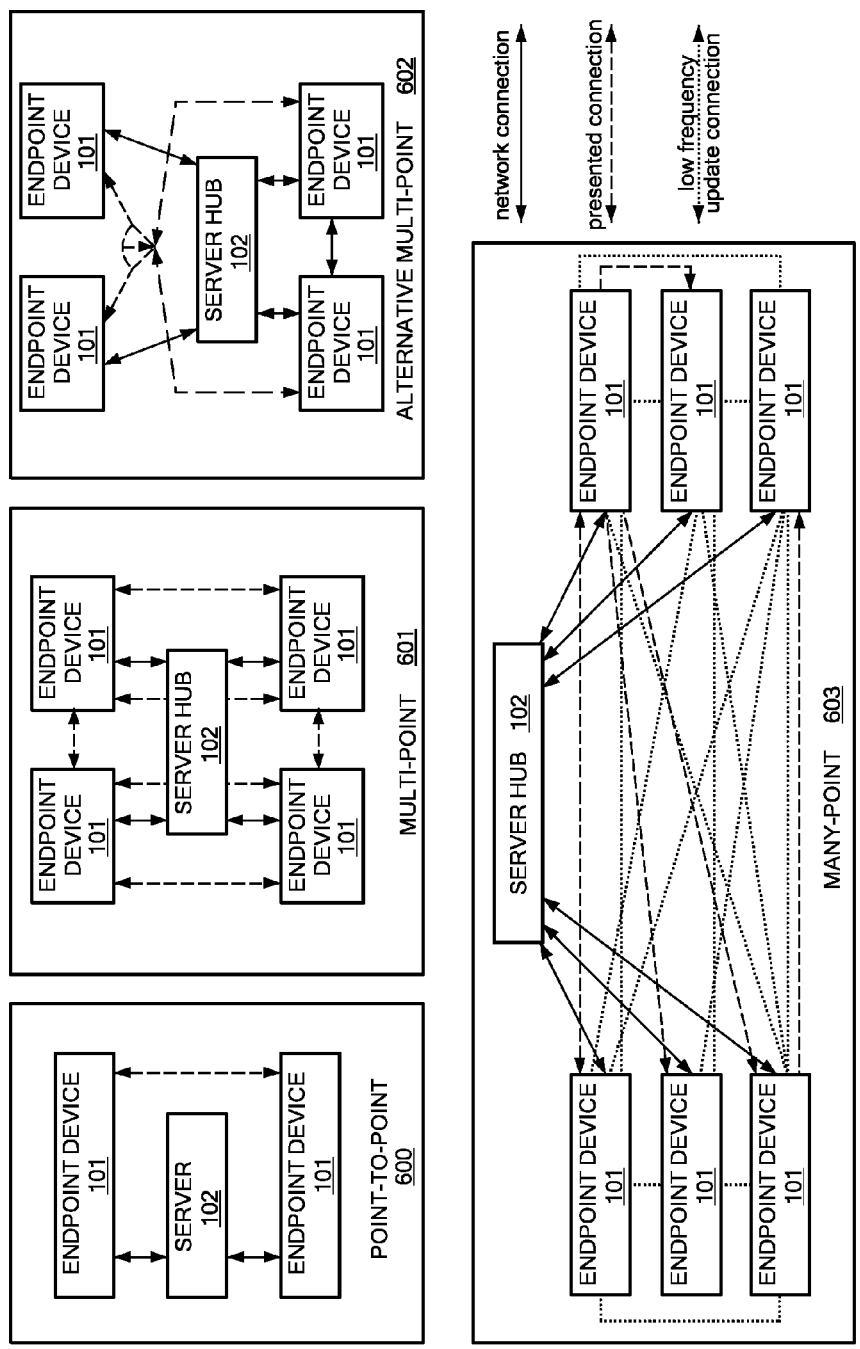
FIG. 6 illustrates three example multimedia communication techniques that may be employed in embodiments of the invention.

FIG. 6 illustrates three different multimedia communication methods supported by an exemplary embodiment of the system. In point-to-point mode 600 the system allows two endpoints to exchange their high frequency streams directly in the manner similar to a traditional telephone call, but with a plurality of multiplexed media streams.

The server is designed to support large scale teleconferencing through point-to-point, multi-point, and many-point. Besides direct point-to-point teleconferencing when viewing persona POI, the server also allows for broadcasting. With broadcasting, a single video capture stream is viewable by more than one personae. This can take place within the context of an open conference where multiple or all personae within a group are broadcasting.

In multi-point mode 601 the system allows more than two participants to exchange their high frequency streams in a single render/playback session. This requires exponentially more bandwidth for each multi-point participant. An alternate multi-point mode 602 displays two participants paired together with combined or exclusive selection of multimedia streams. The primary purpose of this mode is to provide interpretation services such as through video relay service (VRS) or video remote interpreting (VRI).

In many-point mode 603, the system provides an efficient mechanism for potentially hundreds of teleconference participants to simultaneously share a low-bandwidth version of multi-point video while allowing any participant to select any other participant's broadcast stream.

In order to avoid the network overhead of sending each participant n full video streams, only the POI's stream is received at high quality. Group members that are broadcasting but not currently the POI are infrequently updated, with much smaller frames, and with only an audio level indication rather than actual audio. This allows for transmission of non-POI broadcasters at less than 1/100th the bandwidth necessary for high quality. This matrix mode allows any participant to receive any other participant's stream at high quality, unlike most multi-point conferencing systems that only allow one participant to be designated as the high quality broadcaster.

The server also supports a narration mode whereby persona video is displayed over another POI. This video may be broadcast or point-to-point, but does not need to be the dedicated POI to be enabled. Besides serving an instructional use for a curator or moderator to describe content, this mechanism is extended to also allow members to interact about POI without needing to lose focus of the POI.

Unlike many video systems, all video clients communicate with other video clients through the hub server rather than directly. This introduces a small (<50 milliseconds) amount of latency, but allows for recording, dynamic quality management, broadcasting, captioning, and other features. It also greatly simplifies network setup behind firewalls and through cellular bandwidth networks.

To interface with other audio/video systems, a VOIP interface is provided for SIP and, optionally, H.323 connections. This interface allows teleconference participants to use standard audio/video hardware including PSTN phone connections to access a limited representation of the teleconference.

This is facilitated by passing connections through the server as this allows external systems to transparently interface with endpoints, even allowing on-the-fly recoding between codecs.

Figure 7:
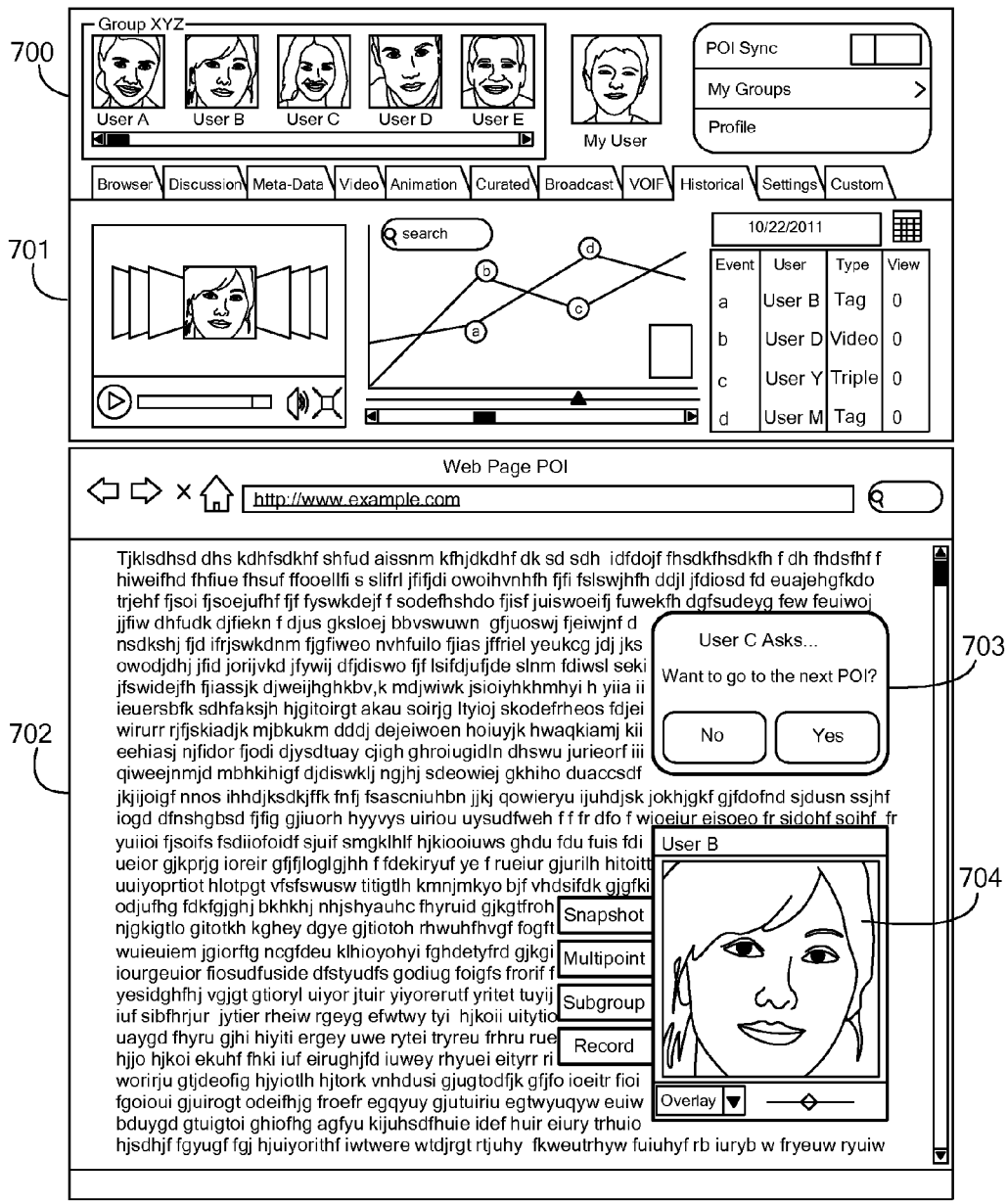
FIG. 7 illustrates an exemplary user interface for a tablet endpoint device.

FIG. 7 illustrates the user interface for a tablet endpoint device in an exemplary embodiment of the present invention. The group display 700 is used to view the continually updating avatars of a plurality of other participants in the group and to access the synchronization lock and community features. The mode display 701 is used to switch between multiple POI interaction modes including, as detailed in this illustration, the historical or archival mode in which a timeline of group or user events, a shuttle for recalling the multimedia and screen recording of specific users, and a summary of events is presented to the endpoint's operator.

The POI display 702 provides the operator with a view of the POI and, optionally, custom POI representation. In the example illustration, the POI is currently an Internet web page, but could be other types of media such as a streaming video, a custom POI interaction, or historical meta-data as described earlier. The POI display may be enlarged to occupy nearly the entire screen to provide a more immersive experience while providing quick access to the different interaction modes.

In the example illustration the user is presented with an event dialog 703 asking a question from another user. The specific event's format and presentation may be customized to fit a broad range of uses from group voting to notification of asynchronous triggers such as completion of a quiz. These event interactions, as with the other facets of user interaction in the system, are tacitly linked to the POI for persistence purposes.

A floating video window 704 displays the high frequency multimedia stream of another participant and allows functions such as adding additional participants to create a multi-point conversation. This is one of several ways in which the high frequency stream may be displayed; others include large format through the video mode of the mode display and as a POI.

Figure 8:
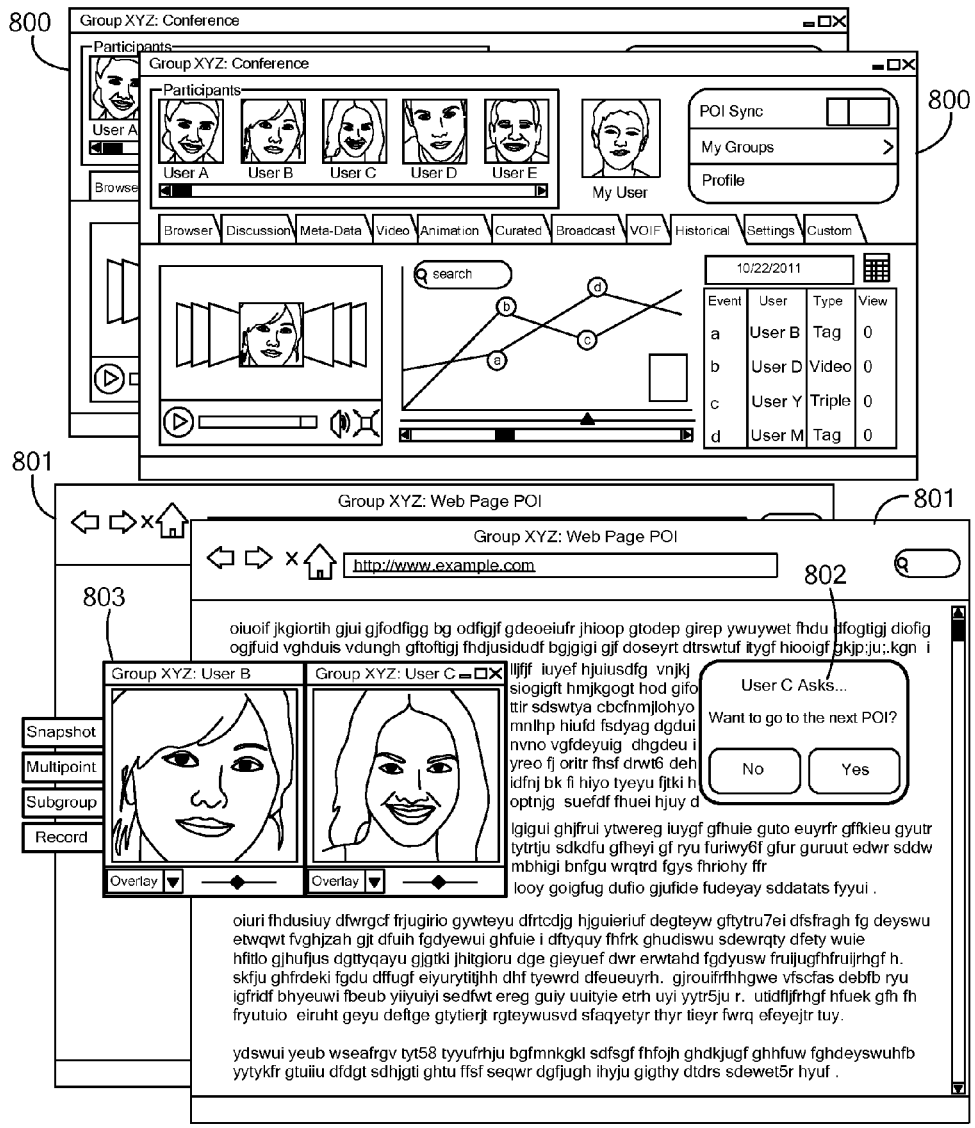
FIG. 8 illustrates an exemplary user interface for a desktop computer endpoint device.

FIG. 8 illustrates the user interface for a desktop computer endpoint device in a further example embodiment of the present invention. When using the desktop computer embodiment, the operator be a member of and display multiple concurrent group conferences. Each group is represented by its own conference window 800, containing the group display 700 and mode display 701, as well as POI window 801 that performs POI rendering and interaction functions in the same fashion as the POI display 702. Each group's POI window may also display an inner event dialog 802, contained within the window's frame.

A group may have a number of video windows 803. In the example illustration, a group's multi-point video shows two participant's high frequency multimedia streams simultaneously. Windows are indicted as belonging to a specific group through their window names. The example desktop computer embodiment also allows docking and linking disparate group windows to facilitate an organized presentation of a plurality of group conferences.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of managing video conferencing over a network, among a plurality of clients using a server as an intermediary, the method comprising;

receiving at the server a real-time video stream from each client;

defining, at the server, content to be shared by the clients;

providing to each client over the network a URL identifying the shared Content;

serving, to any given client, a real-time video stream selected by the given client from among the video streams received at the server; and creating a historical record of the video conference within a database including identifiers identifying all of the shared content by the clients.

2. A method according to claim 1, wherein the plurality is at least three clients.

3. A method according to claim 1, further comprising:
serving, to each client, a set of thumbnail video streams based on the streams received from the clients.

4. A method according to claim 1, further comprising:
receiving at the server from a selected set of the clients a thumbnail image from a camera associated with the client; and
serving to at least one of the clients a set of thumbnail images from the selected set of the clients.

5. A method according to claim 1, wherein the shared content is curated content.

6. A method according to claim 1, wherein one of the clients is an Internet-connected phone.

7. A method according to claim 1, wherein one of the clients is an Internet-connected computer.

8. A method according to claim 1, wherein one of the clients is an Internet-connected electronic device that includes a display.

9. A method according to claim 1, further comprising:
receiving a request to create a group of selected clients associated with a group identifier; and
storing within a database, a database entry identified by the group identifier.

10. A method according to claim 1, wherein the client-selected real-time video stream is served to the selecting client as a high-frequency video stream; and
serving to the selecting client a low-frequency stream including real-time video streams received by the server other than the selected real-time video stream.

11. A method according to claim 10, wherein serving the low-frequency video stream includes serving a set of thumbnail video streams based at least on streams received from some of the other clients.

12. A method according to claim 10, wherein the low-frequency video stream includes the shared content.

13. A method of managing video conferencing over a network, among a plurality of clients using a server as an intermediary, the method comprising;
receiving at the server a real-time video stream from each client;
defining, at the server, content to be shared by the clients;
providing to each client over the network a URL identifying the shared content;
serving, to any given client, a real-time video stream selected by the given client from among the video streams received at the server;
receiving a rating for shared content from one or more clients; and
associating the rating with a database entry for the shared content in a database containing a listing of shared content wherein each entry in the database for shared content is identified by a URL.

14. A method according to claim 13, wherein the plurality is at least three clients.

15. A method according to claim 13, further comprising:
serving, to each client, a set of thumbnail video streams based on the streams received from the clients.

16. A method according to claim 13, further comprising:
receiving at the server from a selected set of the clients a thumbnail image from a camera associated with the client; and
serving to at least one of the clients a set of thumbnail images from the selected set of the clients.

17. A method according to claim 13, wherein the shared content is curated content.

18. A method according to claim 13, wherein one of the clients is an Internet-connected phone.

19. A method according to claim 13, wherein one of the clients is an Internet-connected computer.

20. A method according to claim 13, wherein one of the clients is an Internet-connected electronic device that includes a display.

21. A method according to claim 13, further comprising:
receiving a request to create a group of selected clients associated with a group identifier; and
storing within a database, a database entry identified by the group identifier.

22. A method according to claim 13, wherein the client-selected real-time video stream is served to the selecting client as a high-frequency video stream; and
serving to the selecting client a low-frequency stream including real-time video streams received by the server other than the selected real-time video stream.

23. A method according to claim 22, wherein serving the low-frequency video stream includes serving a set of thumbnail video streams based at least on streams received from some of the other clients.

24. A method according to claim 22, wherein the low-frequency video stream includes the shared content.

25. A method of managing video conferencing over a network, among a plurality of clients using a server as an intermediary, the method comprising;
receiving at the server a real-time video stream from each client;
defining, at the server, content to be shared by the clients;
providing to each client over the network a URL identifying the shared content;
serving, to any given client, a real-time video stream selected by the given client from among the video streams received at the server;
receiving one or more meta-data describing the shared content from a client; and
associating the meta-data with a database entry for the shared content in a database containing a listing of shared content.

26. A method according to claim 25, wherein the plurality is at least three clients.

27. A method according to claim 25, further comprising:
serving, to each client, a set of thumbnail video streams based on the streams received from the clients.

28. A method according to claim 25, further comprising:
receiving at the server from a selected set of the clients a thumbnail image from a camera associated with the client; and
serving to at least one of the clients a set of thumbnail images from the selected set of the clients.

29. A method according to claim 25, wherein the shared content is curated content.

30. A method according to claim 25, wherein one of the clients is an Internet-connected phone.

31. A method according to claim 25, wherein one of the clients is an Internet-connected computer.

32. A method according to claim 25, wherein one of the clients is an Internet-connected electronic device that includes a display.

33. A method according to claim 25, further comprising:
receiving a request to create a group of selected clients associated with a group identifier; and
storing within a database, a database entry identified by the group identifier.

34. A method according to claim 25, wherein the client-selected real-time video stream is served to the selecting client as a high-frequency video stream; and
serving to the selecting client a low-frequency stream including real-time video streams received by the server other than the selected real-time video stream.

35. A method according to claim 34, wherein serving the low-frequency video stream includes serving a set of thumbnail video streams based at least on streams received from some of the other clients.

36. A method according to claim 34, wherein the low-frequency video stream includes the shared content.

37. A method of managing video conferencing over a network, among a plurality of clients using a server as an intermediary, the method comprising;
receiving at the server a real-time video stream from each client;
defining, at the server, content to be shared by the clients;
providing to each client over the network a URL identifying the shared content;
serving, to any given client, a real-time video stream selected by the given client from among the video streams received at the server;
receiving a link to other shared content from a client; and
associating the link with a database entry for shared content in a database containing a listing of shared content.

38. A method according to claim 37, wherein the plurality is at least three clients.

39. A method according to claim 37, further comprising:
serving, to each client, a set of thumbnail video streams based on the streams received from the clients.

40. A method according to claim 37, further comprising:
receiving at the server from a selected set of the clients a thumbnail image from a camera associated with the client; and
serving to at least one of the clients a set of thumbnail images from the selected set of the clients.

41. A method according to claim 37, wherein the shared content is curated content.

42. A method according to claim 37, wherein one of the clients is an Internet-connected phone.

43. A method according to claim 37, wherein one of the clients is an Internet-connected computer.

44. A method according to claim 37, wherein one of the clients is an Internet-connected electronic device that includes a display.

45. A method according to claim 37, further comprising:
receiving a request to create a group of selected clients associated with a group identifier; and
storing within a database, a database entry identified by the group identifier.

46. A method according to claim 37, wherein the client-selected real-time video stream is served to the selecting client as a high-frequency video stream; and
serving to the selecting client a low-frequency stream including real-time video streams received by the server other than the selected real-time video stream.

47. A method according to claim 46, wherein serving the low-frequency video stream includes serving a set of thumbnail video streams based at least on streams received from some of the other clients.

48. A method according to claim 46, wherein the low-frequency video stream includes the shared content.

49. A method of managing video conferencing over a network, among a plurality of clients using a server as an intermediary, the method comprising;
receiving at the server a real-time video stream from each client;
defining, at the server, content to be shared by the clients;
providing to each client over the network a URL identifying the shared content;
serving, to any given client, a real-time video stream selected by the given client from among the video streams received at the server;
receiving an annotation of the shared content from a client; and
associating the annotation of the shared content with a database entry for the shared content.

50. A method according to claim 49, wherein the plurality is at least three clients.

51. A method according to claim 49, further comprising:
serving, to each client, a set of thumbnail video streams based on the streams received from the clients.

52. A method according to claim 49, further comprising:
receiving at the server from a selected set of the clients a thumbnail image from a camera associated with the client; and
serving to at least one of the clients a set of thumbnail images from the selected set of the clients.

53. A method according to claim 49, wherein the shared content is curated content.

54. A method according to claim 49, wherein one of the clients is an Internet-connected phone.

55. A method according to claim 49, wherein one of the clients is an Internet-connected computer.

56. A method according to claim 49, wherein one of the clients is an Internet-connected electronic device that includes a display.

57. A method according to claim 49, further comprising:
receiving a request to create a group of selected clients associated with a group identifier; and
storing within a database, a database entry identified by the group identifier.

58. A method according to claim 49, wherein the client-selected real-time video stream is served to the selecting client as a high-frequency video stream; and
serving to the selecting client a low-frequency stream including real-time video streams received by the server other than the selected real-time video stream.

59. A method according to claim 58, wherein serving the low-frequency video stream includes serving a set of thumbnail video streams based at least on streams received from some of the other clients.

60. A method according to claim 58, wherein the low-frequency video stream includes the shared content.

61. A method of managing video conferencing over a network, among a plurality of clients using a server as an intermediary, the method comprising;
receiving at the server a real-time video stream from each client;
defining, at the server, content to be shared by the clients;
providing to each client over the network a URL identifying the shared content;

serving, to any given client, a real-time video stream selected by the given client from among the video streams received at the server;

receiving a request for a change in the shared content to new shared content by a requesting client; and providing to one or more of the clients as indicated by the requesting client a URL identifying the new shared content.

62. A method according to claim 61, wherein the plurality is at least three clients.

63. A method according to claim 61, further comprising:
serving, to each client, a set of thumbnail video streams based on the streams received from the clients.

64. A method according to claim 61, further comprising:
receiving at the server from a selected set of the clients a thumbnail image from a camera associated with the client; and
serving to at least one of the clients a set of thumbnail images from the selected set of the clients.

65. A method according to claim 61, wherein the shared content is curated content.

66. A method according to claim 61, wherein one of the clients is an Internet-connected phone.

67. A method according to claim 61, wherein one of the clients is an Internet-connected computer.

68. A method according to claim 61, wherein one of the clients is an Internet-connected electronic device that includes a display.

69. A method according to claim 61, further comprising:
receiving a request to create a group of selected clients associated with a group identifier; and
storing within a database, a database entry identified by the group identifier.

70. A method according to claim 61, wherein the client-selected real-time video stream is served to the selecting client as a high-frequency video stream; and
serving to the selecting client a low-frequency stream including real-time video streams received by the server other than the selected real-time video stream.

71. A method according to claim 70, wherein serving the low-frequency video stream includes serving a set of thumbnail video streams based at least on streams received from some of the other clients.

72. A method according to claim 70, wherein the low-frequency video stream includes the shared content.

73. A method of managing video conferencing over a network, among a plurality of clients using a server as an intermediary, the method comprising;
receiving at the server a real-time video stream from each client;
defining, at the server, content to be shared by the clients;
providing to each client over the network a URL identifying the shared content;
serving, to any given client, a real-time video stream selected by the given client from among the video streams received at the server;
receiving a request message from a requesting client for a change in the shared content to new content; and
accessing a permissions database to confirm that the requesting client has authority change the shared content to new content.

74. A method according to claim 73, further comprising, if data in the permissions database indicates that the requesting client has authority to change the shared content, distributing the new content to the requesting client and, if authority exists therefor in the permissions database, to one or more other clients.

75. A method according to claim 73, wherein the plurality is at least three clients.

76. A method according to claim 73, further comprising:
serving, to each client, a set of thumbnail video streams based on the streams received from the clients.

77. A method according to claim 73, further comprising:
receiving at the server from a selected set of the clients a thumbnail image from a camera associated with the client; and
serving to at least one of the clients a set of thumbnail images from the selected set of the clients.

78. A method according to claim 77, wherein serving the low-frequency video stream includes serving a set of thumbnail video streams based at least on streams received from some of the other clients.

79. A method according to claim 77, wherein the low-frequency video stream includes the shared content.

80. A method according to claim 73, wherein the shared content is curated content.

81. A method according to claim 73, wherein one of the clients is an Internet-connected phone.

82. A method according to claim 73, wherein one of the clients is an Internet-connected computer.

83. A method according to claim 73, wherein one of the clients is an Internet-connected electronic device that includes a display.

84. A method according to claim 73, further comprising:
receiving a request to create a group of selected clients associated with a group identifier; and
storing within a database, a database entry identified by the group identifier.

85. A method according to claim 73, wherein the client-selected real-time video stream is served to the selecting client as a high-frequency video stream; and
serving to the selecting client a low-frequency stream including real-time video streams received by the server other than the selected real-time video stream.

* * * * *